United States Patent [19]

Bengtsson

[11] Patent Number: 5,057,263
[45] Date of Patent: Oct. 15, 1991

[54] METHOD OF FORMING A PIPE SOCKET

[75] Inventor: Christer Bengtsson, Varnamo, Sweden

[73] Assignee: Forsheda AB, Forsheda, Sweden

[21] Appl. No.: 388,802

[22] Filed: Aug. 3, 1989

Related U.S. Application Data

[62] Division of Ser. No. 259,126, Oct. 18, 1988, Pat. No. 4,984,831.

[30] Foreign Application Priority Data

Oct. 29, 1987 [SE] Sweden .................................. 8704231

[51] Int. Cl.$^5$ ........................ B29C 45/14; B29C 57/00
[52] U.S. Cl. .................................... 264/249; 285/374; 285/423; 264/273; 264/274; 264/275; 264/279; 264/328.2; 264/328.8; 264/322; 425/392; 425/DIG. 218
[58] Field of Search ............... 264/246, 248, 249, 250, 264/251, 255, 273, 274, 279, 279.1, 328.1, 275, 328.2, 295, 318, 322, 328.8, 325; 285/379, 374, 345, 110, 423; 425/DIG. 218, 392

[56] References Cited

U.S. PATENT DOCUMENTS

| | | | |
|---|---|---|---|
| 3,791,678 | 2/1974 | DePutter | 285/379 |
| 4,038,359 | 7/1977 | Pendleton | 264/273 |
| 4,231,983 | 11/1980 | French | 264/322 |
| 4,372,905 | 2/1983 | Bohman | 264/318 |
| 4,406,852 | 9/1983 | Riegel | 264/322 |
| 4,410,479 | 10/1983 | Cyriax | 264/255 |
| 4,428,899 | 1/1984 | Van Manen | 264/318 |
| 4,468,367 | 8/1984 | Beune et al. | 264/255 |
| 4,474,723 | 10/1984 | Irmer | 264/295 |
| 4,743,422 | 5/1988 | Kalvis-Nielsen et al. | 264/318 |
| 4,834,428 | 5/1989 | Pritchatt | 264/274 |

FOREIGN PATENT DOCUMENTS

| | | | |
|---|---|---|---|
| 036454 | 9/1981 | European Pat. Off. | 264/255 |
| 2215584 | 10/1972 | Fed. Rep. of Germany | 285/423 |
| 57-74124 | 5/1982 | Japan | 264/250 |
| 2182866 | 5/1987 | United Kingdom | 264/279 |

Primary Examiner—Jan H. Silbaugh
Assistant Examiner—Mathieu Vargot
Attorney, Agent, or Firm—Jeffers, Hoffman & Niewyk

[57] ABSTRACT

A method of forming at the end portion of a thermoplastic material pipe in a pipe socket. The pipe end portion is molded around an annular sleeve onto which is bonded a sealing ring having an outer sealing ring adapted for sealing against the pipe end portion and an inner sealing ring, connected to the outer sealing ring, adapted for sealing against an outer surface of a spigot end of a connecting pipe introduced into the socket.

5 Claims, 4 Drawing Sheets

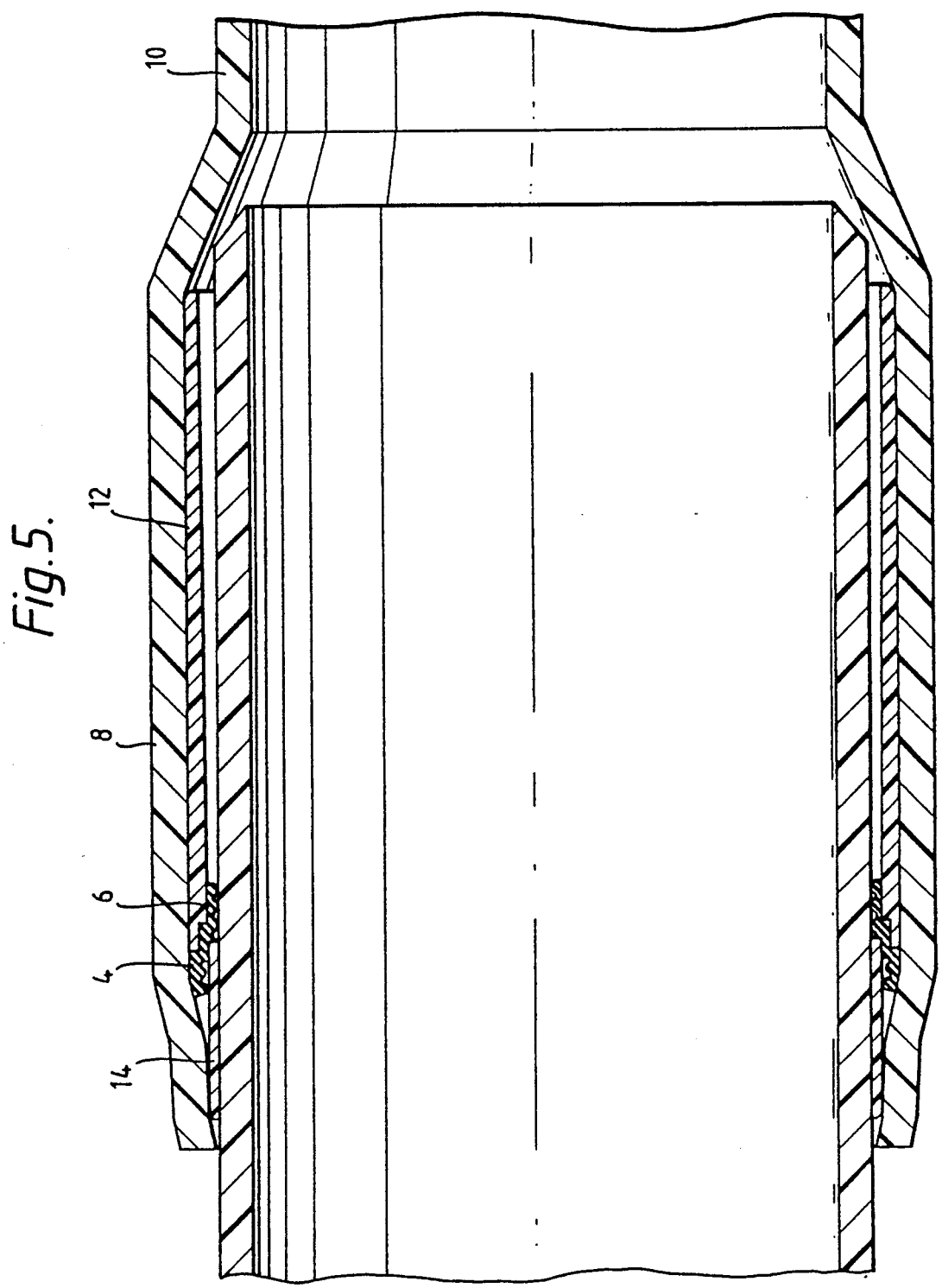

METHOD OF FORMING A PIPE SOCKET

CROSS-REFERENCE TO RELATED APPLICATION

This is a continuation of application Ser. No. 259,126, filed Oct. 18, 1988 now U.S. Pat. No. 4,984,831.

BACKGROUND OF THE INVENTION

The present invention relates to a pipe socket and a method of forming a pipe socket at the end portion of a thermoplastic material pipe.

A pipe joint between the end portions of plastic pipes is usually established by introducing a spigot end of one of the pipe end portions into a socket of the other pipe end portion, the sealing between the outer surface of the spigot end and the inner surface of the socket being provided by means of a sealing ring positioned in the annular space between said surfaces. Thereby, it is usual to locate the sealing ring in an inner groove in the socket. In pipes consisting of thermoplastic material, especially polyvinyl chloride, it is common to form the socket necessary for the pipe jointing by radially expanding the pipe wall in the region of the pipe end portion. This is usually conducted by heating the pipe end portion to a plastic condition, whereupon the pipe end portion thus being in softened state is radially expanded by means of a mandrel which is introduced into the pipe end portion. It is common practice to provide the pipe end portion in the same step of operation with an inner groove for receiving the sealing ring which is subsequently used for sealing the joint between the socket and the spigot end introduced therein.

According to a method recently developed the so called socketing operation for forming the socket at the pipe end portion and the positioning of the sealing ring in a locked-in position in the socket is conducted in one single step by positioning the sealing ring on the mandrel before the mandrel is introduced into the softened pipe end portion, whereupon the softened pipe end portion is moved along the outer surface of the mandrel as well as the sealing ring positioned thereon, the sealing ring being retained in the socket after the pipe end portion has been cooled and solidified and the mandrel has been withdrawn from the socket. Thus, the ring constitutes a mould element during the socketing operation and constitutes a sealing ring during a subsequent jointing operation.

In connection with certain thermoplastic materials the method of forming a pipe socket described above can not be used because of the fact that these plastic materials have insufficient shape permanence. Thus, in manufacturing sockets in polyethylene pipes it has been necessary to manufacture separate sockets by means of injection moulding and to connect the sockets with the end portions of the polyethylene pipes by means of welding or other connection methods.

The object of the invention is to provide a pipe socket and a method of forming such a pipe socket which can be used also in connection with pipes having inferior shape permanence and dimensional stability in connection with heating.

In order to comply with this object the pipe socket according to the invention comprises a sleeve defining the inner surface of the socket, an end portion of a thermoplastic material pipe moulded around the sleeve, an outer sealing ring positioned between the inner surface of the pipe end portion and the outer surface of the sleeve for sealing the pipe end portion and the sleeve in relation to each other and an inner sealing ring positioned at the inner surface of the sleeve for sealing the space between the inner surface of the pipe socket and the outer surface of a spigot end of a connecting pipe introduced into the socket, the pipe socket being characterized in that the outer sealing ring and the inner sealing ring are connected with each other.

In a preferred embodiment of the pipe socket according to the invention the sealing rings are chemically bound to the sleeve.

In accordance with the invention it is possible to provide a pipe socket by heating the end portion of the thermoplastic material pipe and moving the end portion over the sleeve while the end portion is expanded for providing the pipe socket which will then consist of the pipe end portion and said sleeve, the inner surface of the sleeve defining the inner surface of the pipe socket. Thereby the inferior shape permanence and dimensional stability of the termoplastic material of the pipe end portion are of no importance as the surface which is of importance with regard to the tightness of the pipe joint, namely the inner surface of the socket, is defined by the sleeve which is of good shape permanence and dimensional stability.

In a preferred embodiment of the pipe socket according to the invention the outer surface of the sleeve has a section of a larger diameter and a section positioned adjacent the free end of the pipe socket of less diameter, an annular surface positioned between said sections and extending transversely of the axis of the sleeve, the outer sealing ring being constituted by a sealing lip having a base portion which is connected with and is preferably chemically bound to the sleeve at said annular surface and is positioned in a space defined by said annular surface and by the inner surface of the pipe end portion and the section of the outer surface of the sleeve having less diameter.

In the method of forming a pipe socket according to the invention a pipe end portion is moulded around a sleeve which after the moulding operation is left in the pipe end portion for defining the inner surface of the socket, wherein the sleeve is in advance of the moulding of the pipe end portion around the sleeve provided with an outer sealing ring for sealing the pipe end portion and the sleeve in relation to each other and with an inner sealing ring connected with said outer sealing ring for sealing the space between the inner surface of the pipe socket and the outer surface of a spigot end of a connecting pipe introduced into the socket.

BRIEF DESCRIPTION OF THE DRAWINGS

It is preferred that the sealing rings are chemically bound to the sleeve.

The invention is described in the following with reference to the accompanying drawings.

FIG. 5 is an axial section of a pipe joint formed by means of a pipe socket according to the invention.

DETAILED DESCRIPTION

Figure 1:
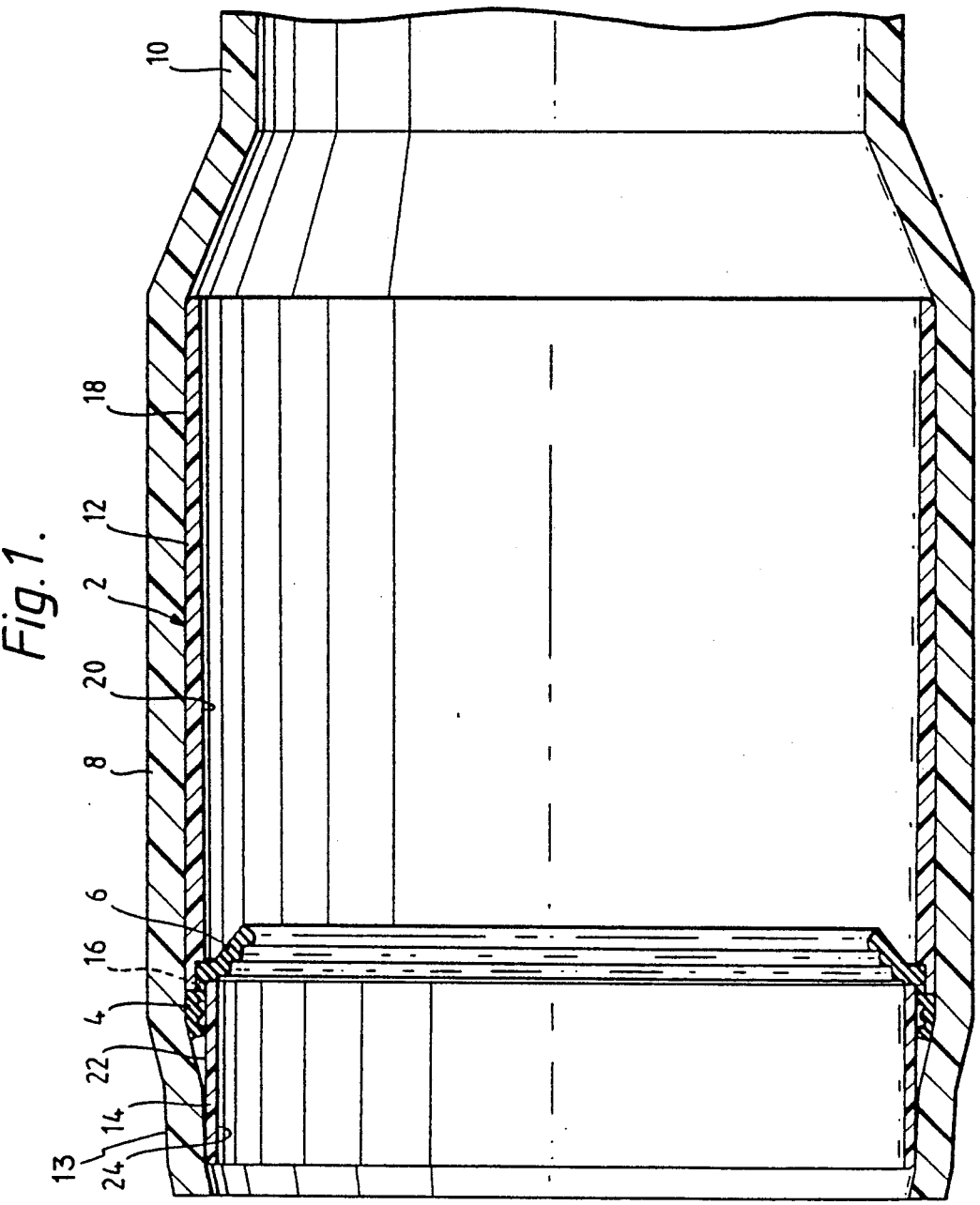
FIG. 1 is an axial section of a pipe socket according to the invention.

The pipe socket according to the invention shown in an axial section in FIG. 1 comprises a sleeve 2, an outer sealing ring 4 connected with the sleeve, an inner sealing ring 6 also connected with the sleeve and an expanded pipe end portion 8 of a pipe 10 of thermoplastic material, e.g. polyethylene, moulded around the sleeve 2.

The sleeve 2 has a portion 12 of larger diameter and a portion 14 of less diameter positioned at the free end of the socket. Between the portions 12 and 14 the sleeve forms an annular wall portion 16 extending transversely of the axis of the sleeve and having a thickness of the same range as the wall thickness of the portions 12 and 14. Thus, the portion 12 of the sleeve forms a section 18 of the outer surface of the sleeve of larger outer diameter and a section 20 of the inner surface of the sleeve of larger inner diameter, while the portion 14 of the sleeve forms a section 22 of the outer surface of the sleeve of less outer diameter and a section 24 of the inner surface of the sleeve of less inner diameter. At the outer surface of the sleeve 2 the wall portion 16 of the sleeve forms an annular surface 26 facing the free end of the socket and forms at the inner side of the sleeve an annular surface 28 directed from the free end of the socket.

The outer sealing ring 4 is in the form of a sealing lip having a base portion 28 which is bound to the sleeve at the annular surface 26. In the completed pipe socket the sealing lip 4 is positioned within a space defined by the annular surface 26, the inner surface of the pipe end portion 8 and the surface section 22 of the sleeve 2 for sealing the sleeve 2 and the pipe end portion 8 in relation to each other.

Also the inner sealing ring 6 is in the form of a sealing lip having a base portion 30 which is bound to the annular surface 28. The sealing lip 6 is intended for sealing the pipe socket in relation to a spigot end introduced into the pipe socket as shown in FIG. 5.

Figure 3:
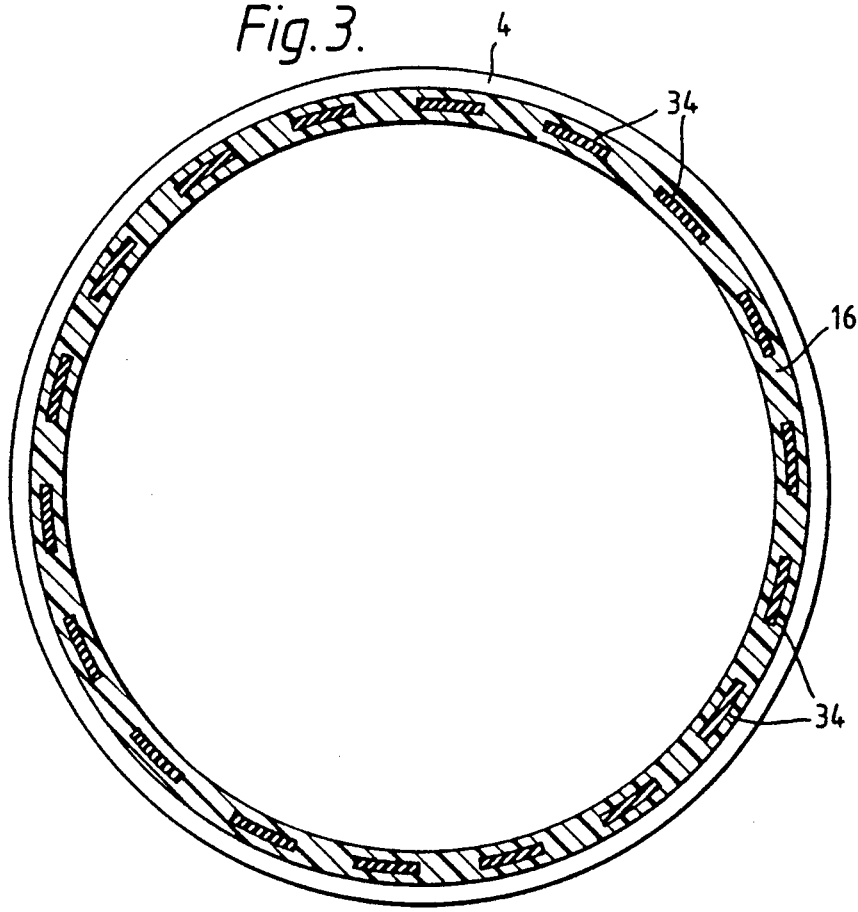
FIG. 3 is a cross section on line II—II of the sleeve shown in FIG. 2.
Figure 4:
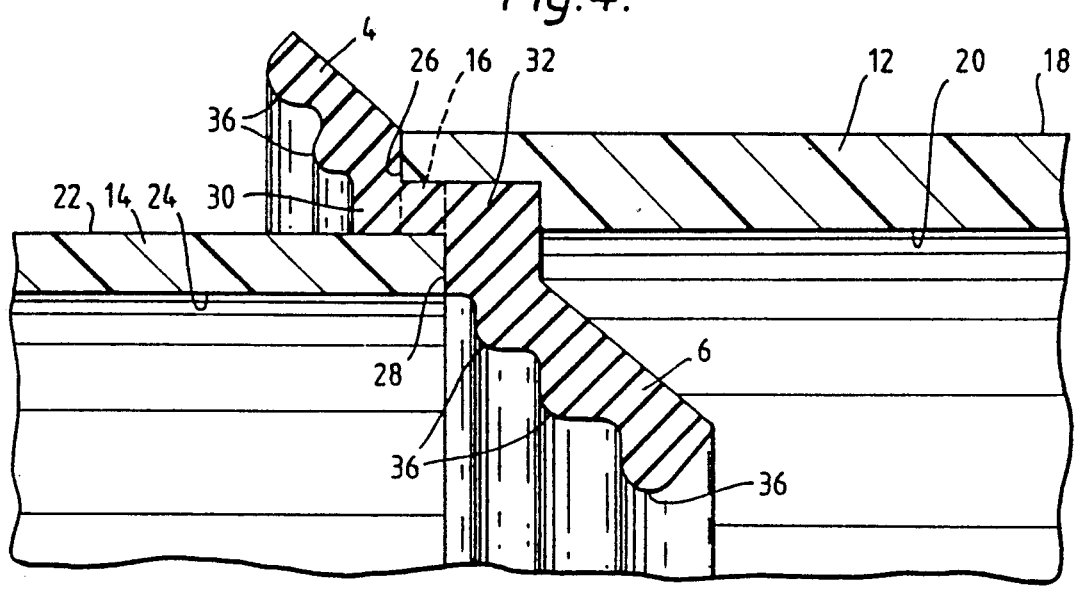
FIG. 4 is a detail of the sleeve according to FIG. 2 on an enlarged scale.

The base portions 30 and 32 of the sealing lips 4 and 6 are connected with each other through slot shaped openings 34 extending through the wall portion 1 as most clearly shown in FIG. 3. This provides in addition to the chemical binding of the sealing lips to the sleeve also a mechanical binding thereof to the sleeve.

At the surfaces of the sealing lips 4 and 6 intended to engage the surface section 22 and the outer surface of the spigot end introduced into the socket there are provided continuous ridges 36 in order to improve the sealing effect.

Figure 2:
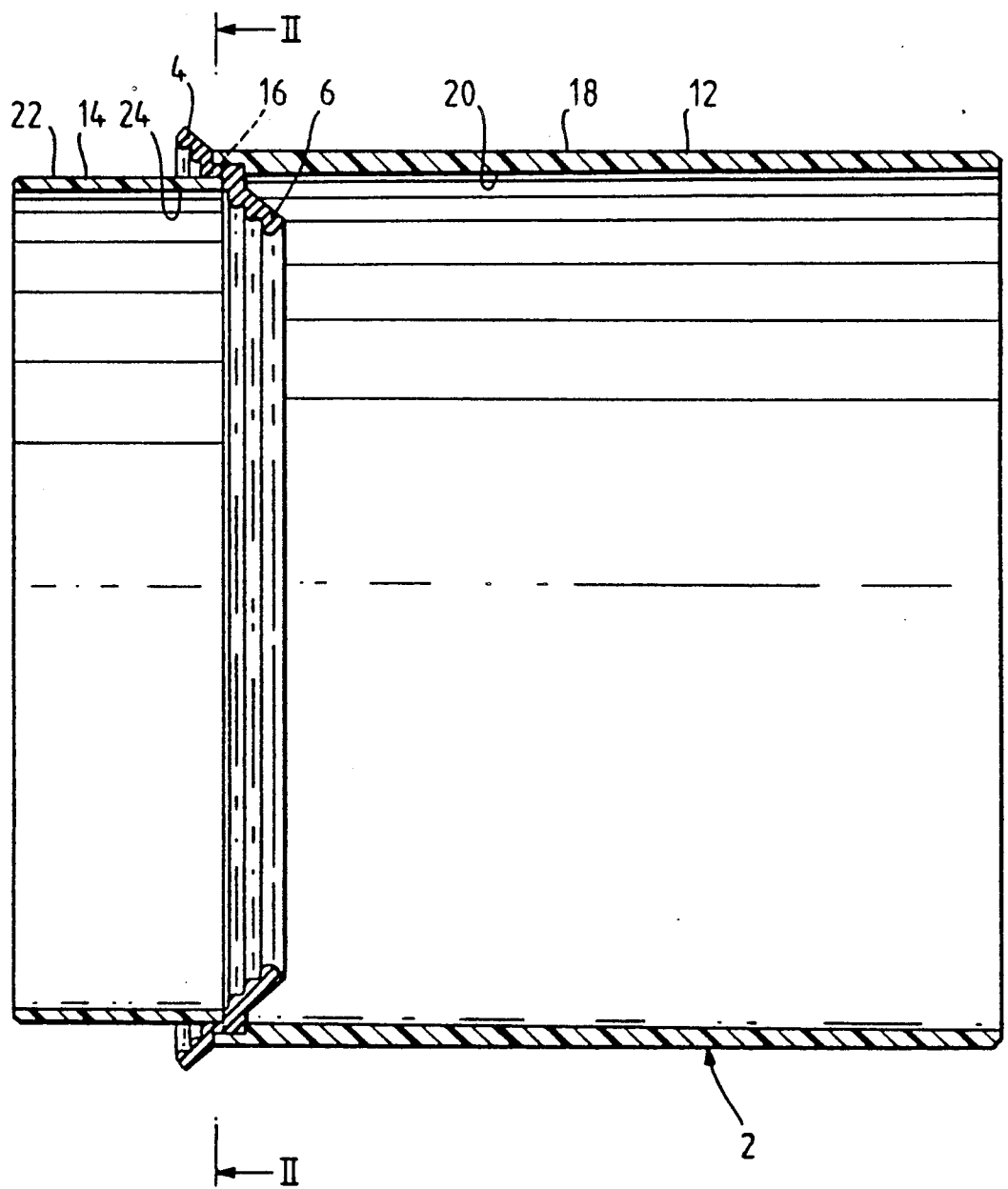
FIG. 2 is an axial section of a sleeve included in a pipe socket according to the invention.

As appears from FIG. 2 the sealing lips 4 and 6 extend from their base portions 30 and 32, respectively, obliquely outwards from the surface sections 22 and 20, respectively, of the sleeve in such a way that the sealing lips form in their relaxed condition an angle of about 40° with these surface sections.

As appears from FIG. 1 the pipe end portion 8 closely connects with the outer surface of the sleeve 2 in sealing relationship with the sealing lip 4. At its free end portion the pipe end portion 8 extends beyond the end surface of the portion 14 of the sleeve 2. The outer edge section of the pipe end portion 2 has somewhat reduced diameter so that the sleeve 2 is thereby axially fixed in the pipe end portion 8.

The sleeve 2 having the sealing lips 4 and 6 as shown in FIG. 2 is manufactured by positioning in a mould the plastic sleeve previously manufactured by injection moulding, the mould having cavities adjacent the sleeve for forming the sealing lips 4 and 6.

Thus, the sealing lips 4 and 6 are moulded by injecting unvulcanized rubber into said mould cavities, the rubber material being of such a kind in relation to the plastic material forming the sleeve that there is provided a chemical binding between the rubber material and the plastic material. After the rubber material has vulcanized there has been provided a sleeve of the design shown in FIG. 2.

The pipe socket is thereupon formed by positioning the sleeve including the sealing lips 4 and 6 on a mandrel and by moving the heated, softened pipe end portion 8 in the axial direction over the mandrel and the sleeve positioned thereon. Thereby the pipe end portion 8 is expanded to the position shown in FIG. 1. After the pipe end portion 8 has been chilled and solidified and the socket thus formed has been separated from the mandrel with the sleeve retained in the pipe end portion in a locked-in position the pipe socket shown in FIG. 1 has been provided.

Because of the fact that the inner surface of the pipe socket is constituted by the sleeve 2 there has been provided a pipe socket having good shape permanence and dimensional stability and good tolerances in spite of the fact that the material of the pipe end portion per se has rather bad properties in these respects.

The pipe socket can be used for connecting the pipe 10 to another pipe by introducing the spigot end thereof into the pipe socket to the position shown in FIG. 5.

The invention can be modified within the scope of the following claims.

I claim:

1. A method of forming a pipe socket at the end portion of a continuous pipe having a substantially uniform diameter, said pipe end portion being made of a thermoplastic material, comprising the steps of:

providing an annular sleeve having opposite ends and having at least one opening therein intermediate its ends;

injection molding to said sleeve, at a position intermediate the ends thereof, an outer sealing ring adapted for sealing against an outer surface of the sleeve and an inner surface of the pipe end portion and an inner sealing ring adapted for sealing against an inner surface of the sleeve and an outer surface of a spigot end of a connecting pipe introduced into the socket, said step of injection molding connecting said outer sealing ring to said inner sealing ring through said intermediate opening to bond said rings to said sleeve;

heating the pipe end portion and expanding the heated pipe end portion; and molding the heated pipe end portion around said sleeve and said outer sealing ring whereby the outer sealing ring seals said pipe end portion in relation to said sleeve, said molding step forming the entire socket and said sleeve extending substantially the entire length of the socket and defining an inner surface of the socket.

2. The method of claim 1 wherein the sleeve includes a plurality of intermediate openings therein, and the step of injection molding connects the outer sealing ring to the inner sealing ring through said plurality of openings.

3. A method as claimed in claim 1 wherein the sealing rings are chemically bonded to the sleeve.

4. A method as claimed in claim 1 wherein the sleeve is provided with the outer sealing ring by positioning the sleeve in a mold having a mold cavity adjacent the outer surface of the sleeve, the mold cavity being formed so as to provide an outer sealing ring of desired shape, and wherein a polymeric material for forming the outer sealing ring is injected in the mold cavity and is caused to polymerize or vulcanize while being chemically bonded to the sleeve.

5. A method as claimed in claim 1 wherein the sleeve is provided with the outer sealing ring and the inner sealing ring by positioning the sleeve in a mold having a mold cavity adjacent the outer surface of the sleeve as well as a mold cavity adjacent the inner surface of the sleeve, the mold cavities being formed so as to provide the outer sealing ring and inner sealing ring, respectively, of desired shape and being connected with each other through openings in the wall of the sleeve, and wherein a polymeric material for forming the sealing rings is injected in the mold cavities and is caused to polymerize or vulcanize, the sealing rings being connected with each other through openings in the wall of the sleeve.

* * * * *